(12) United States Patent
Hirota et al.

(10) Patent No.: US 8,982,223 B2
(45) Date of Patent: Mar. 17, 2015

(54) IMAGE SENDING APPARATUS, IMAGE RECORDING APPARATUS AND IMAGE RECORDING METHOD USING IDENTIFICATION INFORMATION RELATING REDUCED IMAGE DATA WITH ORIGINAL IMAGE DATA

(75) Inventors: Ryo Hirota, Osaka (JP); Tsutomu Mukai, Osaka (JP); Hiroshi Yamaura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 251 days.

(21) Appl. No.: 13/434,138

(22) Filed: Mar. 29, 2012

(65) Prior Publication Data

US 2012/0249808 A1    Oct. 4, 2012

(30) Foreign Application Priority Data

Mar. 30, 2011   (JP) ................................. 2011-075024

(51) Int. Cl.
*H04N 5/232* (2006.01)
*H04N 1/00* (2006.01)
*H04N 1/32* (2006.01)
*H04N 21/2743* (2011.01)
*H04N 21/4143* (2011.01)
*H04N 21/4223* (2011.01)
*H04N 21/4402* (2011.01)
(Continued)

(52) U.S. Cl.
CPC ...... *H04N 1/00159* (2013.01); *H04N 2201/325* (2013.01); *H04N 1/00241* (2013.01); *H04N 1/00244* (2013.01); *H04N 1/32117* (2013.01); *H04N 5/772* (2013.01); *H04N 21/2743* (2013.01); *H04N 21/4143* (2013.01); *H04N 21/4223* (2013.01); *H04N 21/440263* (2013.01); *H04N 21/4788* (2013.01); *H04N 21/8153* (2013.01); *H04N 2201/0039* (2013.01); *H04N 2201/0041* (2013.01); *H04N 2201/0084* (2013.01); *H04N 2201/33357* (2013.01); *H04N 2201/3278* (2013.01); *H04N 2201/3274* (2013.01)
USPC ................ 348/211.3; 348/207.99; 348/222.1; 348/231.2

(58) Field of Classification Search
USPC .................................. 348/222.1, 231.2, 211.3
See application file for complete search history.

(56) References Cited

U.S. PATENT DOCUMENTS 5,822,541 A * 10/1998 Nonomura et al. ........... 709/247
6,356,662 B1 * 3/2002 Tsai .............................. 382/234
(Continued)

FOREIGN PATENT DOCUMENTS

| JP | 2007-006355 | 1/2007 |
| JP | 2007-336403 | 12/2007 |

(Continued)

*Primary Examiner* — Ngoc-yen Vu
(74) *Attorney, Agent, or Firm* — Panasonic Patent Center

(57) ABSTRACT

An image sending apparatus capable of sending image data to an image recording apparatus connected to a network, includes a sending unit configured to send image data, a selecting unit configured to select an image to be sent based on a user's operation, and a controller configured to control the sending unit. The controller controls the sending unit to send reduced image data generated by reducing original image data of the image selected by the selecting unit to the image recording apparatus, and to send the original image data corresponding to the reduced image data sent to the image recording apparatus to the image recording apparatus.

9 Claims, 11 Drawing Sheets

(51) Int. Cl.
*H04N 21/4788* (2011.01)
*H04N 21/81* (2011.01)
*H04N 5/76* (2006.01)
*H04N 5/77* (2006.01)

(56) References Cited

U.S. PATENT DOCUMENTS

| | | | |
|---|---|---|---|
| 7,027,084 B1* | 4/2006 | Watanabe | 348/211.2 |
| 7,095,982 B2* | 8/2006 | Mizutani | 455/41.2 |
| 7,120,593 B1* | 10/2006 | Fry et al. | 705/27.1 |
| 7,362,352 B2* | 4/2008 | Ueyama | 348/207.1 |
| 7,734,724 B2* | 6/2010 | Rezvani et al. | 709/219 |
| 7,881,369 B2* | 2/2011 | Murai et al. | 375/240.01 |
| 7,898,567 B2* | 3/2011 | Kim | 348/14.12 |
| 8,068,698 B2* | 11/2011 | Klassen et al. | 382/298 |
| 8,073,965 B2* | 12/2011 | Anderson | 709/235 |
| 8,515,195 B2* | 8/2013 | Mishima et al. | 382/240 |
| 2002/0051074 A1* | 5/2002 | Kawaoka et al. | 348/376 |
| 2007/0040928 A1* | 2/2007 | Jung et al. | 348/362 |
| 2007/0291303 A1 | 12/2007 | Tanaka et al. | |
| 2008/0212884 A1* | 9/2008 | Oneda et al. | 382/232 |
| 2011/0113097 A1 | 5/2011 | Takeuchi | |
| 2011/0254966 A1 | 10/2011 | Tanaka et al. | |
| 2011/0289136 A1* | 11/2011 | Klassen | 709/203 |
| 2013/0084904 A1* | 4/2013 | Park et al. | 455/500 |

FOREIGN PATENT DOCUMENTS

| | | |
|---|---|---|
| JP | 2008-236159 | 10/2008 |
| JP | 2010-004403 | 1/2010 |

* cited by examiner

Fig. 7

<HISTORY INFORMATION>

| SENDING ID | CREATE DATE AND TIME | COPY 1 | COPY 2 | ... | COPY N |
|---|---|---|---|---|---|
| 0001 | 2010.01.01 17:53:04 | REGION B | | | |
| 0003 | 2010.01.01 17:55:16 | | | | |
| 0006 | 2010.01.03 07:10:25 | REGION B | REGION C | | |
| ... | ... | | | | |

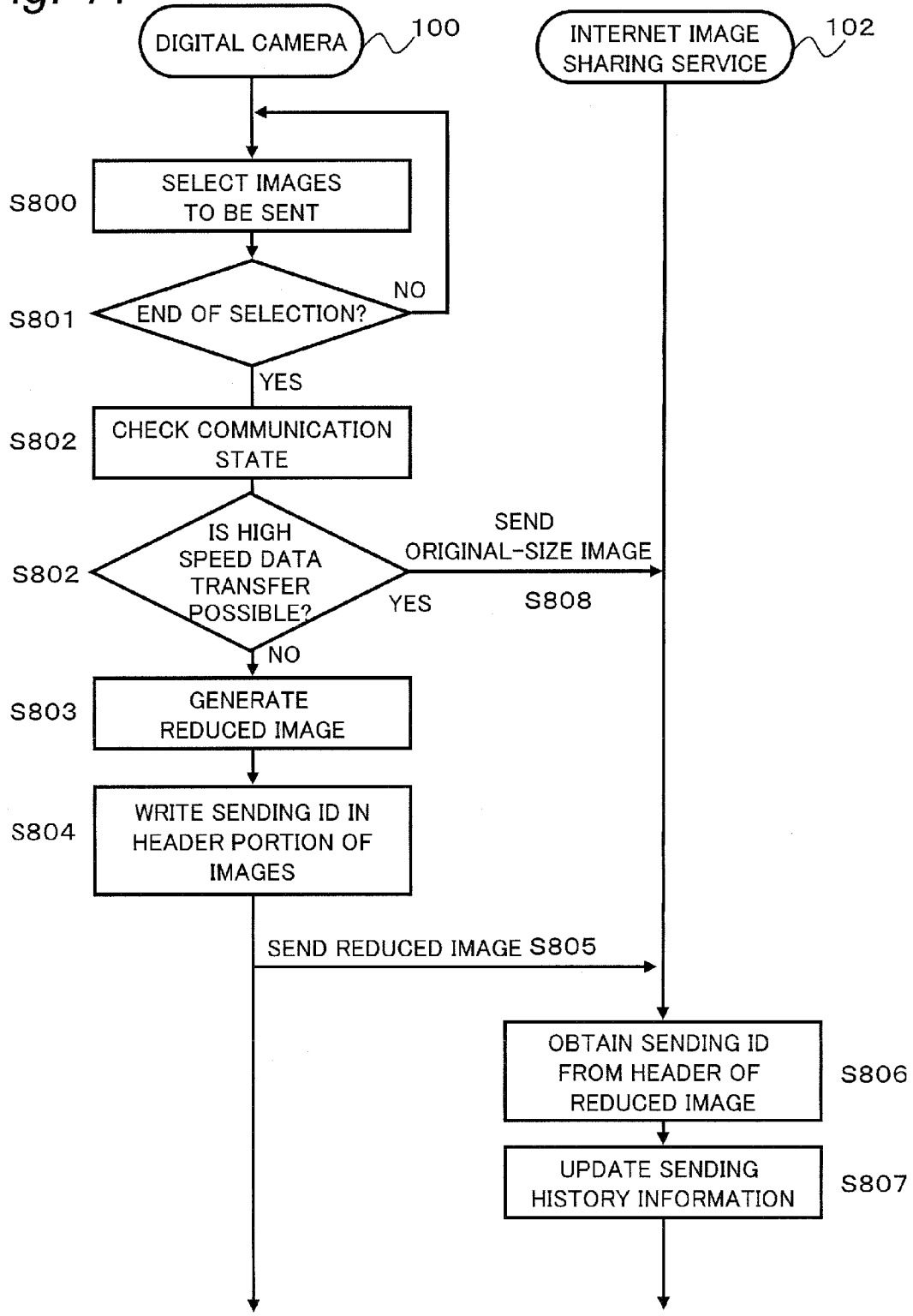

IMAGE SENDING APPARATUS, IMAGE RECORDING APPARATUS AND IMAGE RECORDING METHOD USING IDENTIFICATION INFORMATION RELATING REDUCED IMAGE DATA WITH ORIGINAL IMAGE DATA

BACKGROUND

1. Technical Field

The technical field relates to an image sending apparatus capable of sending image data to a predetermined apparatus on a network to store the image data therein, and an image recording apparatus for receiving images from the image sending apparatus and storing them therein.

2. Related Art

As to an imaging apparatus such as a digital camera, an image sharing system that enables images photographed by a user to be shared with other people is known. For example, in an image sharing system disclosed in JP2008-236159A, a communication apparatus with a camera photographs a code representing a region of an external server which stores images photographed by a digital camera therein. The image sharing system accesses the external server according to the photographed code so as to obtain the images stored in the eternal server.

In general, image data to be uploaded to the external server is preferably high-quality image data for sharing of the image data. However, when the high-quality image data is sent to the external server under a circumstance of a low sending speed, it takes a long time to complete uploading to the external server (data transfer) because the high quality image has generally large data size, resulting in inconvenience for users. Further, when the data transfer takes a long time, battery consumption increases, resulting in inconvenience for users also in this viewpoint.

In view of the above problem, an image sending apparatus is provided that improves convenience relating to uploading of images for users, and an image recording apparatus for receiving images from the image sending apparatus and storing the images therein.

SUMMARY

In a first aspect, an image sending apparatus is provided, which is capable of sending image data to an image recording apparatus connected to a network. The image sending apparatus includes a sending unit configured to send image data, a selecting unit configured to select an image to be sent based on a user's operation, and a controller configured to control the sending unit. The controller controls the sending unit to send reduced image data generated by reducing original image data of the image selected by the selecting unit to the image recording apparatus, and to send the original image data corresponding to the reduced image data sent to the image recording apparatus to the image recording apparatus.

In a second aspect, an image recording apparatus is provided which is capable of receiving image data from the image sending apparatus and storing the received image data therein. The image recording apparatus includes a communication unit configured to receive image data via a network, a data storage unit configured to store the received image data, and a controller configured to control recording of the image data to the data storage unit. When reduced image data is received from the image sending apparatus, the controller controls the data storage unit to store the received reduced image data therein. Thereafter when original image data corresponding to the reduced image data stored in the data storage unit is received from the image sending apparatus, the controller controls the data storage unit to replace the reduced image data stored in the data storage unit by the received original image data.

In a third aspect, an image recording method for recording image data received via a network is provided. The image recording method includes receiving reduced image data that is generated by reducing original image data, from an image sending apparatus via the network, storing the received reduced image data in a data storage unit, thereafter, when receiving the original image data corresponding to the reduced image data stored in the data storage unit from the image sending apparatus, replacing the reduced image data stored in the data storage unit by the received original image data.

According to the above aspects, in a situation where high-speed communication cannot be expected or battery consumption is a matter of concern, reduced images of which data size is small are sent (uploaded) once, and when such a situation disappears later, the reduced images are replaced by high-quality original images. In this manner, the reduced images with small size are sent when the high-speed communication cannot be expected, and thus image transfer can be completed in a short amount of time, so that wait time for the data transfer is reduced and battery consumption is also reduced. When the high-speed communication is enabled later (namely, in a situation that a user's convenience is not deteriorated), original-size images can be sent, and thus user's convenience of the image uploading can be improved.

Therefore, the image sending apparatus and the image recording apparatus can be realized, which can improve convenience for users in uploading of images.

BRIEF DESCRIPTION OF DRAWINGS

FIG. 7 is a diagram describing history information.

FIG. 11 is a flowchart illustrating an operation for uploading from the digital camera of a second embodiment to the image sharing service.

DETAILED DESCRIPTION OF PREFERRED EMBODIMENTS

Embodiments will be described below with reference to the accompanying diagrams.

First Embodiment

A digital camera according to the first embodiment includes a communication unit for uploading original image data (hereinafter, "original-size image") and image data obtained by reducing the original-size image (hereinafter "reduced image") as an object to be uploaded to a server for providing an internet image sharing service. The digital camera uploads the reduced image to the server for providing the internet image sharing service, where the internet image sharing service stores the uploaded reduced image. After the uploading of the reduced image, the digital camera can send the original-size image corresponding to the reduced image uploaded previously to the server for providing the internet image sharing service via a personal computer. When receiving the original-size image, the server for providing the internet image sharing service replaces the reduced image uploaded previously by the received original-size image and stores it therein.

With such an arrangement, in a situation where high-speed communication cannot be expected or in a situation that battery consumption is a matter of concern, the reduced image with small data size can be once uploaded, and when such a situation is solved later, the original-size image with large data size can be sent to replace the reduced image. In short, when the high-speed communication cannot be expected, the reduced image with small size is sent so that image transfer can be completed in a short amount of time. Therefore, a user's waiting time for data transfer is reduced, and battery consumption is also reduced. When the high-speed communication is enabled later, the original-size image can be sent, and thus user's convenience of the image transfer can be improved.

A configuration and an operation of the digital camera according to the first embodiment will be described in detail below.

1. Configuration

Figure 1A:
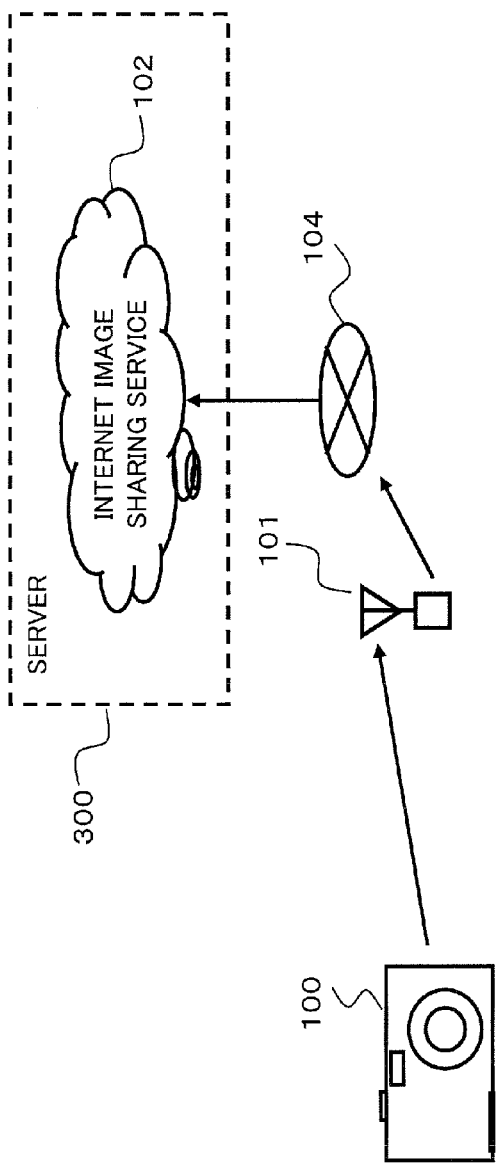
FIGS. 1A and 1B are diagrams illustrating a connecting relationship between a digital camera according to an embodiment and a server that provides an internet image sharing service.
Figure 1B:
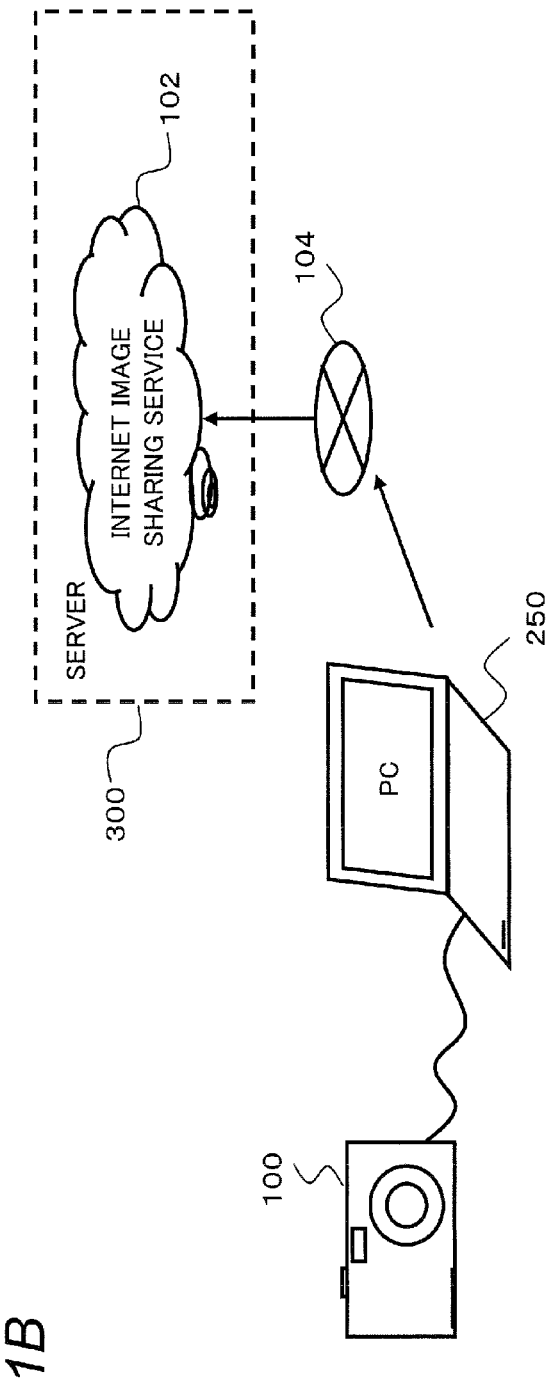

FIGS. 1A and 1B are diagrams describing an image sharing system according to the first embodiment. The image sharing system is composed of a digital camera 100 and a server 300 for providing an Internet image sharing service 102. The digital camera 100 can upload image data to the internet image sharing service 102 or the server 300 directly as shown in FIG. 1A, or via a personal computer 250 as shown in FIG. 1B.

The digital camera 100, the personal computer 250, the server 300 and the Internet image sharing service 102 in the image sharing system will be described in detail below.

1-1. Configuration of Digital Camera

Figure 2:
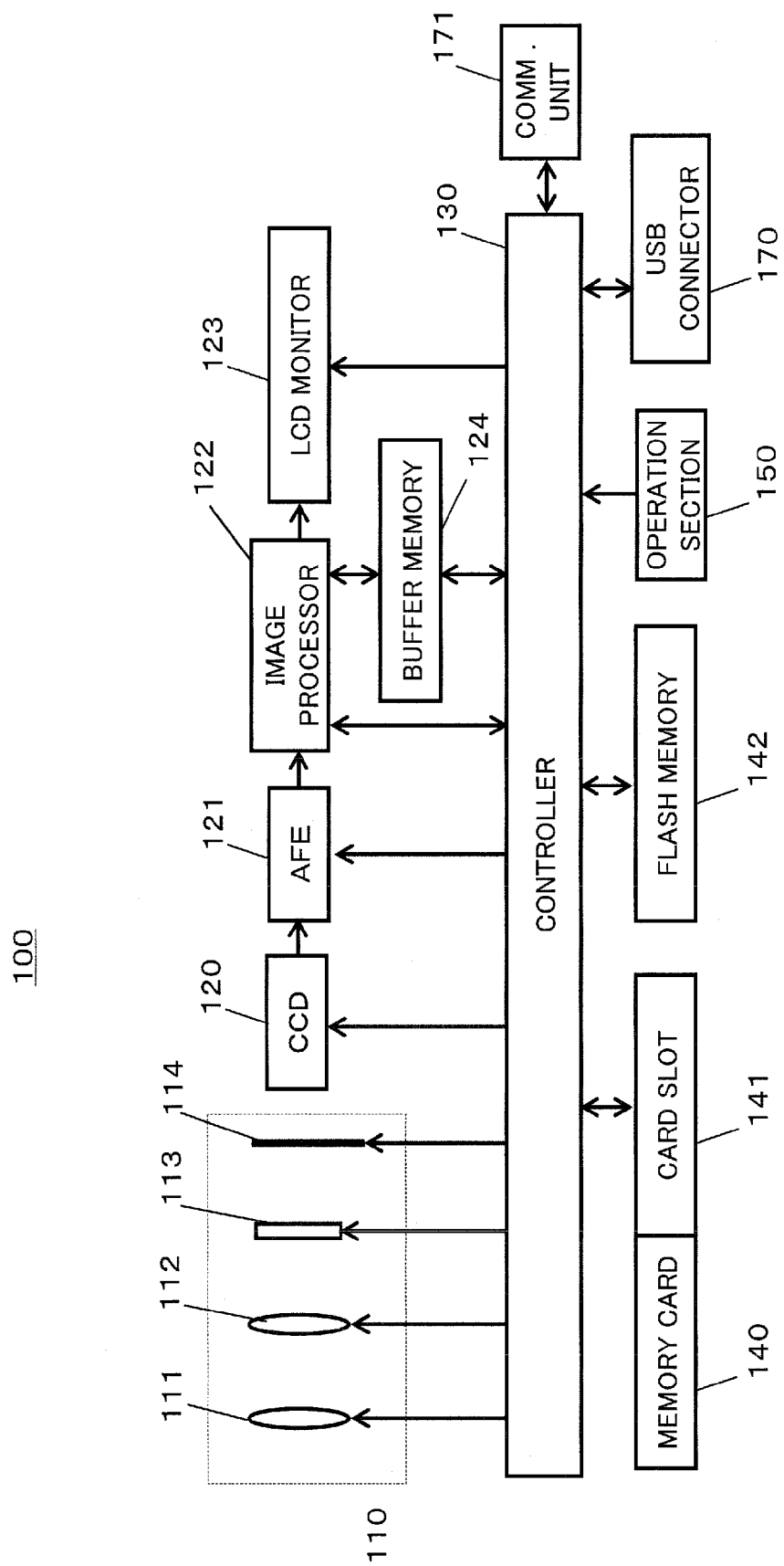
FIG. 2 is a diagram illustrating a configuration of the digital camera.

The configuration of the digital camera 100 will be described with reference to FIG. 2. The digital camera 100 captures a subject image formed via an optical system 110 with a CCD image sensor 120. Image data generated by the CCD image sensor 120 is subject to various processes in an AFE (analog front end) 121 and an image processor 122. The generated image data is recorded in a flash memory 142 or a memory card 140. The image data recorded in the flash memory 142 or the memory card 140 is displayed on a liquid crystal monitor 123 upon receipt of a user's operation of an operation section 150. The respective sections composing the digital camera 100 will be described in detail below.

The optical system 110 includes a focus lens 111, a zoom lens 112, a diaphragm 113, and a shutter 114. The optical system 110 may include an optical camera shake correction lens OIS (Optical Image Stabilizer), which is not shown. The various lenses composing the optical system 110 may be composed of any number of lenses or any groups of lenses.

The CCD image sensor 120 captures a subject image formed via the optical system 110 to generate image data. The CCD image sensor 120 generates image data of a new frame at a predetermined frame rate (for example, 30 frames/sec). An image data generation timing and an electronic shutter operation of the CCD image sensor 120 are controlled by a controller 130. The image data is displayed on the liquid crystal monitor 123 as through images one by one, so that the user can check a situation of the subject on the liquid crystal monitor 123 at real time.

The AFE 121 carries out noise suppression using correlated double sampling, multiplication of a gain based on an ISO sensitivity using an analog gain controller and AD conversion using an AD converter on the image data read from the CCD image sensor 120. Thereafter, the AFE 121 outputs the image data to the image processor 122.

The image processor 122 gives various processes to the image data output from the AFE 121. Examples of the various processes include BM (block memory) integration, smear correction, white balance correction, gamma correction, a YC converting process, an electronic zoom process, a compression process, and a decompression process, but the processes are not limited to them. The image processor 122 may be realized by a hard-wired electronic circuit or by a microcomputer or the like using a program. Further, the image processor 122 as well as the controller 130 may be realized by one semiconductor chip.

The liquid crystal monitor 123 is provided on a rear surface of the digital camera 100. The liquid crystal monitor 123 displays images based on the image data processed in the image processor 122. The images to be displayed on the liquid crystal monitor 123 include through images and recorded images. The through images are such that new frame images, which are generated by the CCD image sensor 120 at every constant time, are sequentially displayed. Normally, when the digital camera 100 is in a recording mode, the image processor 122 generates through images based on the image data generated by the CCD image sensor 120. The user referring to the through images displayed on the liquid crystal monitor 123 photographs a subject while checking a composition of the subject. Recording image are displayed when the digital camera 100 is in a reproducing mode, and images obtained by reducing high-pixel moving images or still images recorded in the memory card 140 or the like to low-pixel images for display on the liquid crystal monitor 123.

The controller 130 generally controls an entire operation of the digital camera 100. The controller 130 may be composed of a hard-wired electronic circuit or a microcomputer. Further, the controller 130 as well as the image processor 122 may be composed on one semiconductor chip.

The flash memory 142 functions as an internal memory for recording image data or the like. Further, the flash memory 142 stores a program for generally controlling the entire operation of the digital camera 100 as well as programs relating to autofocus control (AF control) and automatic exposure control (AE control).

A buffer memory 124 is a storage unit that functions as a work memory of the image processor 122 and the controller 130. The buffer memory 124 can be realized by a DRAM (Dynamic Random Access Memory) or the like.

A card slot 141 is a connecting unit into which the memory card 140 is attachable. The card slot 141 can electrically and mechanically connect the memory card 140. Further, the card slot 141 may have a function for controlling the memory card 140.

The memory card 140 is an external memory containing a storage section such as the flash memory. The memory card 140 can record data such as image data to be processed in the image processor 122.

A USB connector 170 is an interface that connects a USE connector of another device via a USB cable. The controller 130 can send/receive various data to/from another device via the USB connector 170 and the USE cable.

The communication unit 171 is a wireless or wired communication interface, and the controller 130 can be connected to an internet network through the communication unit 171 via an access point. For example, the communication unit 171 can be realized by USE, Bluetooth (registered trademark), wireless LAN, or wired LAN.

The operation section 150 is a general name of an operation button or an operation lever provided to an outer packaging of the digital camera 100. The operation section 150 receives user's operations. When the operation section 150 receives user's operations, it sends various operating instruction signals according to the operations to the controller 130.

1-2. Configuration of Personal Computer

Figure 3:
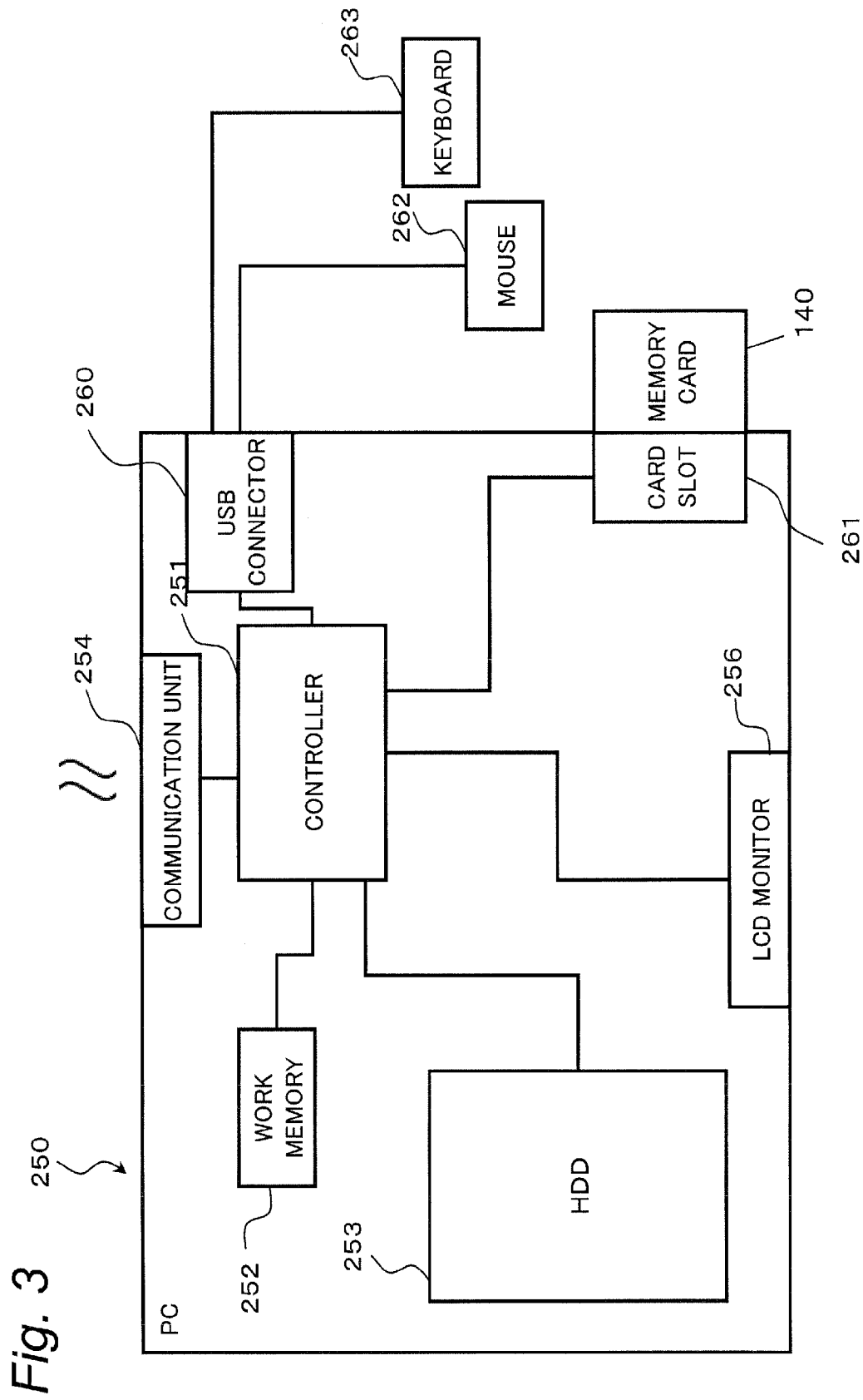
FIG. 3 is a diagram illustrating a configuration of a personal computer.

A configuration of the personal computer (hereinafter, "PC") 250 will be described below with reference to FIG. 3.

The PC 250 includes a controller 251, a work memory 252, an HDD 253, a communication unit 254, a liquid crystal monitor 256, a USE connector 260, a card slot 261, a mouse 262, and a keyboard 263.

The controller 251 is a processor for executing processes of the PC 250. The controller 251 is electrically connected to the work memory 252, the HDD 253, the communication unit 254, the liquid crystal monitor 256, the USB connector 260, the card slot 261, the mouse 262, and the keyboard 263. The controller 251 receives user's operation information via the USE connector 260 using the mouse 262 and the keyboard 263. The controller 251 can read data stored in the HDD 253. Further, the controller 251 generally controls a whole system, such as control of electric power supplied to the respective sections of the PC 100.

The work memory 252 is a memory for temporarily storing information necessary for various processing operations performed by the controller 251.

The HDD 253 is a high-capacity disc drive for storing various data. The various data stored in the HDD 253 can be read suitably by the controller 251.

The mouse 262 is a pointing device for receiving user's operations. The keyboard 263 is a keyboard device through which a user inputs characters.

The USB connector 260 is an interface for connecting to an USE connector of another device via a USB cable. The controller 251 can send/receive information to/from another device via the USE connector 260 and the USE cable. The USE connector 260 connects to the digital camera 100, the mouse 262, and the keyboard 263.

The liquid crystal monitor 256 is a display device for displaying an image instructed from the controller 251.

The communication unit 254 can send image data received from the controller 251 to another device via an internet network. The communication unit 254 can be realized by, for example, a wireless LAN or a wired LAN.

The card slot 261 is a connecting unit to which the memory card 140 is attachable. The card slot 261 can electrically and mechanically connect to the memory card 140. The card slot 261 may have a function for controlling the memory card 140. The controller 251 can read image data stored in the memory card 140.

1-3. Configuration of Server for providing Internet Image Sharing Service

Figure 4:
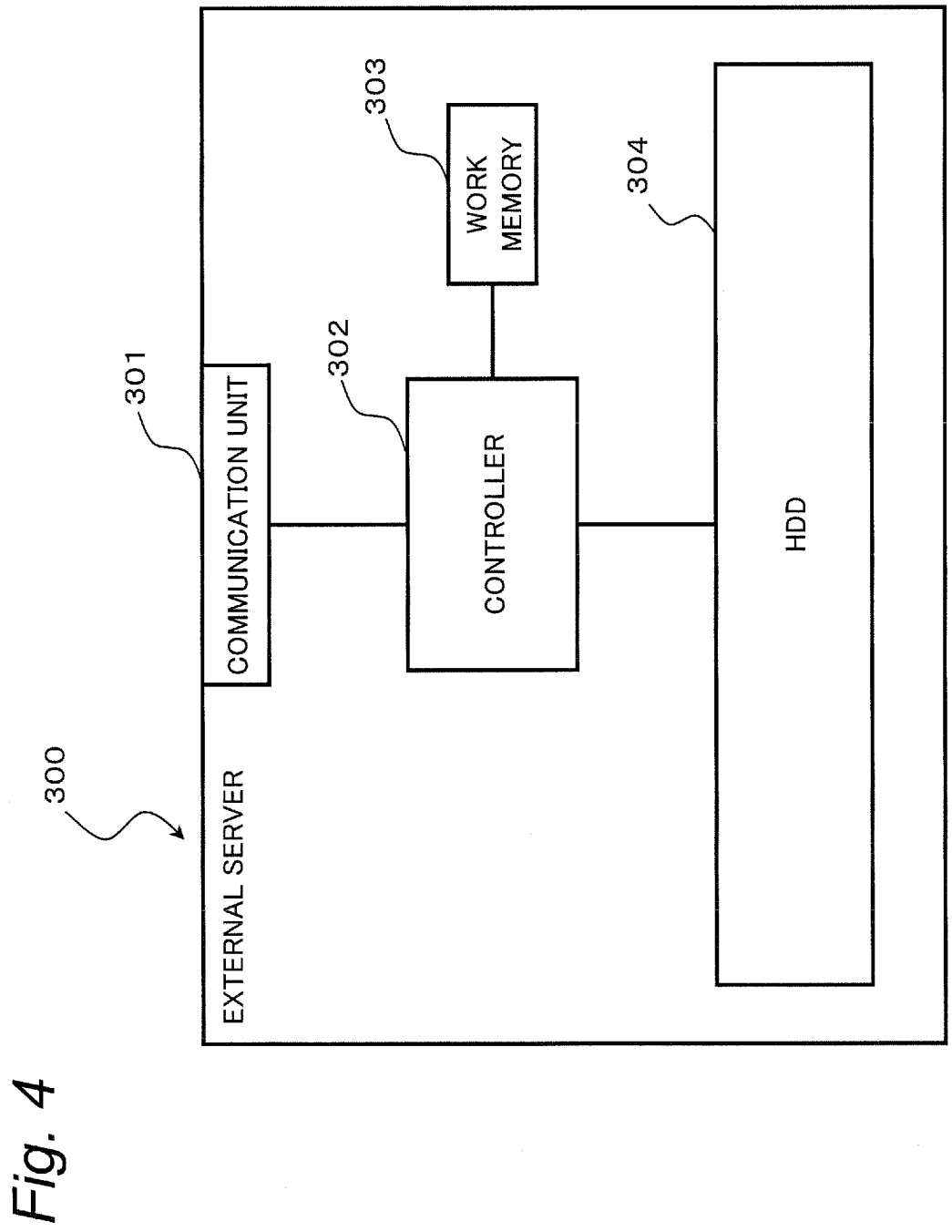
FIG. 4 is a diagram illustrating a configuration of the server that provides the internet image sharing service.

A configuration of the server (hereinafter, "external server") 300 for providing the internet image sharing service 102 will be described below with reference to FIG. 4.

The external server 300 is composed of a controller 302, a work memory 303, an HDD 304, and a communication unit 301.

The controller 302 is a processor for executing processes of the external server 300. The controller 302 is electrically connected to the work memory 303, the HDD 304, and the communication unit 301. The controller 302 can read data stored in the HDD 304.

The work memory 303 is a memory for temporarily storing information necessary for various processing operations performed by the controller 302.

The HDD 304 is a high-capacity disc drive for storing various data. The various data stored in the HDD 304 can be read suitably by the controller 302. Further, original-size images and reduced images received via the communication unit 301 are also stored in the HDD 304.

The communication unit 301 can receive image data from another device via an internet network. The received image data is stored in the HDD 304 by the controller 302. The communication unit 301 can be realized by a wireless LAN or a wired LAN.

1-4. Internet Image Sharing Service

The internet image sharing service 102 to be provided by the external server 300 will be described.

In order to use the service in the internet image sharing service 102, a user is necessary to make registration. Account information is given to each of the registered users, and a region in the HOD 304 which can store image data is allocated to each of the registered users.

When one user (hereinafter, "user A") registered in the internet image sharing service 102 sends image data via the digital camera to the external server 300 for providing the internet image sharing service 102, the external server 300 receives the image data via the communication unit 301. The controller 302 stores the received image data in the region (hereinafter, "region A") in the HOD 304 allocated to the user A in advance. Further, the external server 300 for providing the internet image sharing service 102 can set the region (region A) allocated to the user A so that the image data to be stored in that region can be browsed by another user (hereinafter, "user B") according to a request from the user A. In this case, the user B can freely browse the images stored in the region A. Further, when the user B sends a copy request by specifying images to be copied in the region A to the external server 300 for providing the internet image sharing service 102, the external server 300 for providing the internet image sharing service 102 copies the specified images from the region A of the user A to a region (hereinafter, "region B") in the HDD 304 allocated to the user B in advance, and stores them therein. Such image storage and sharing services are main services of the internet image sharing service 102.

2. Operation

2-1. Transfer of Reduced Images from Digital Camera to Server for Providing Internet Image Sharing Service Transfer of images from the digital camera 100 to the external server 300 for providing the internet image sharing service 102 will be described. As shown in FIG. 1A, an operation such that the digital camera 100 is connected to an internet via the wireless LAN, and image data is transferred to the internet image sharing service 102 will be described.

As shown in FIG. 1A, the digital camera 100 is connected to an internet network 104 via an access point 101. When the digital camera 100 is out of the house, it can be connected to the internet network 104 by using a public wireless LAN and a tethering function of a mobile terminal. In general, a data transfer rate in this connecting method is not sufficiently high for transfer of large volumes of data. From this viewpoint, when the digital camera 100 according to the first embodiment is not connected to the PC 250 (namely, when sufficiently high-speed data transfer cannot be expected), it sends reduced image of which image size is comparatively small to the server 300 for providing the internet image sharing service 102.

Figure 5:
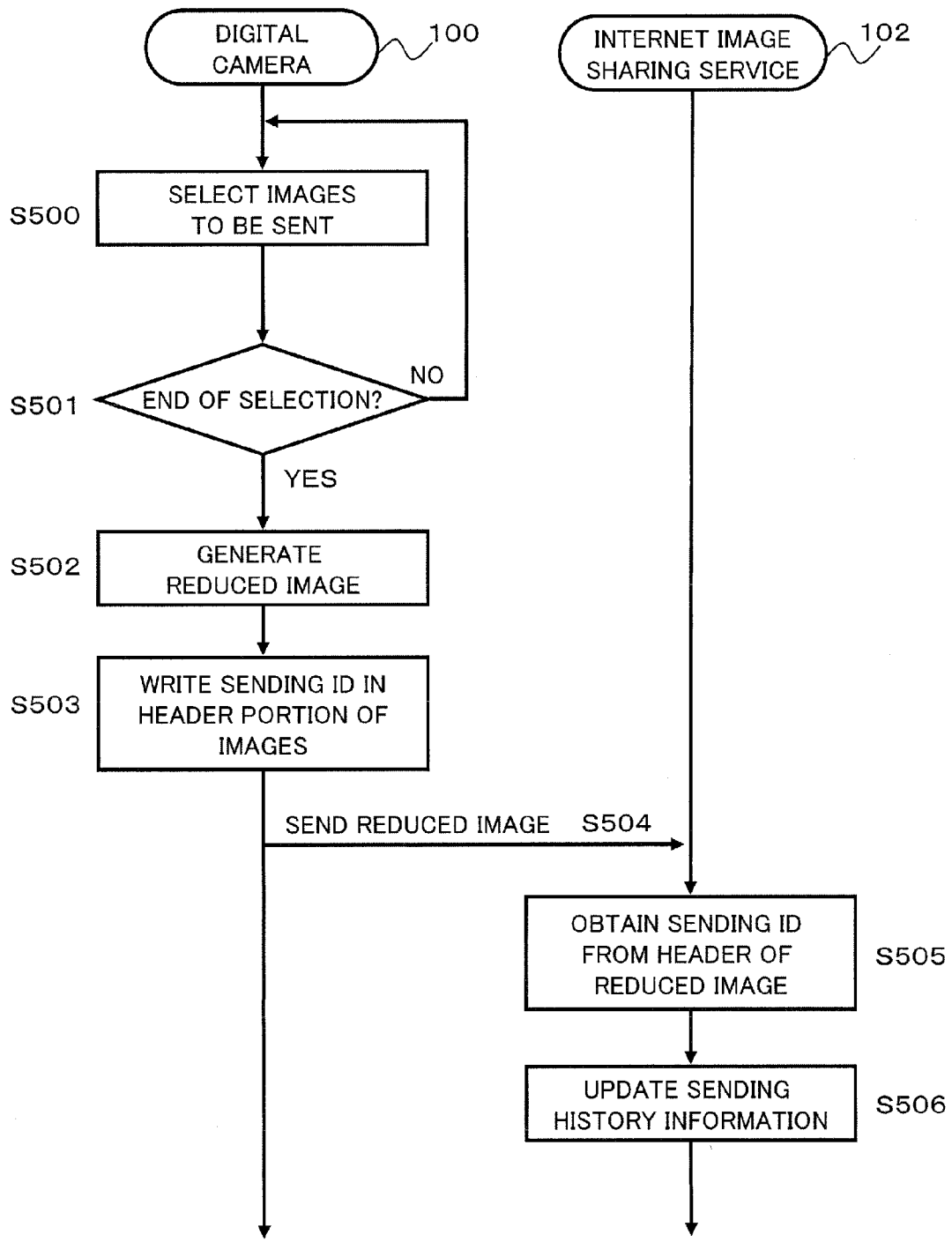
FIG. 5 is a flowchart of an operation for uploading reduced images from the digital camera of a first embodiment to the image sharing service.

FIG. 5 is a flowchart illustrating an operation for uploading reduced images from the digital camera 100 to the server 300 for providing the image sharing service 102. When the digital camera 100 is set to the reproducing mode by an operation of the user A, the controller 130 performs the control to display thumbnail images of the image data recorded in the memory card 140 or the flash memory 142 on the liquid crystal monitor 123 in view format. At this time, when receiving a predetermined operation of the operation section 150 from the user A, the controller 130 changes mode setting of the digital camera 100 into a mode for selecting upload images.

Figure 6:
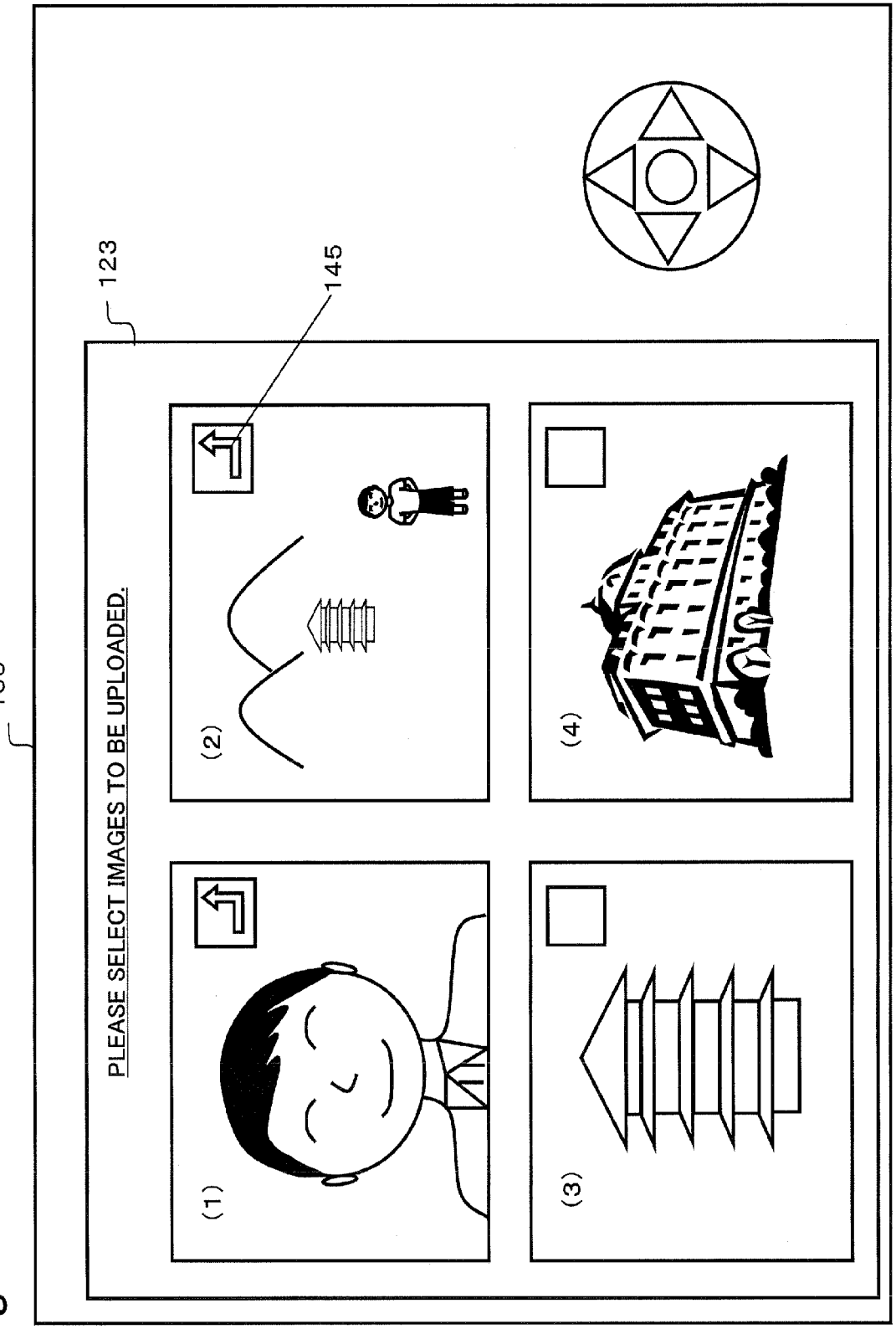
FIG. 6 is a diagram illustrating a screen for selecting image data to be uploaded.

When the mode setting of the digital camera 100 is changed into a mode for selecting upload images, the controller 130 displays a screen shown in FIG. 6 on the liquid crystal monitor 123. FIG. 6 is a diagram illustrating the screen for selecting image data to be uploaded. As shown in FIG. 6, the liquid crystal monitor 123 displays the thumbnail images of the image data recorded in the memory card 140, and also displays a message "Please Select images to be uploaded." for prompting the user to perform a selecting operation. While viewing the thumbnails displayed on the liquid crystal monitor 123, the user A can select image data to be uploaded.

The user A can select image data to be uploaded by operating the predetermined operation section 150. When the image data to be uploaded is selected by the user A (S500), the controller 130 displays a mark 145 on the thumbnail image of the image data which is selected by the user A as an object to be uploaded, where the mark represents that image data is selected as an object to be uploaded. The user A can check which image data is selected as an object to be uploaded from the thumbnail images displayed on the liquid crystal monitor 123 with the displayed mark 145.

The user A can end the selection of images to be uploaded by operating the predetermined operation section 150. The controller 130 monitors whether the user A ends the selection of images to be uploaded (S501). When the user A operates the predetermined operation section 150 and a determination is made that the selection of images to be uploaded is ended (Yes at S501), the controller 130 generates unique sending IDs for each of plural pieces of the image data selected as an object to be uploaded. The controller 130 generates reduced images corresponding to the image data (namely, the original-size images) selected to be uploaded (S502). The controller 130 opens the original-size images and the corresponding reduced images on the buffer memory 124, and writes the sending IDs to header portions of those images (S503). The controller 130, then, records the original-size images, which the sending IDs are written into the header portions, in the memory card 140 or the flash memory 142. Further, the controller 130 sends the reduced images, which the sending IDs are written in the header portions, to the internet image sharing service 102 (S504). At this time, the controller 130 may process all the images to be uploaded at one time, or may sequentially process each image in such a manner that while one image is transferred at step S504, a reduced image of the next image is generated. At this time, the digital camera 100 also sends account information about the user (in this example, the user A) to the server 300 for providing the internet image sharing service 102. With this arrangement, the internet image sharing service 102 can recognize the user and a region storing the images (in this example, the region A).

In the external server 300 for providing the internet image sharing service 102, the controller 302 stores the received reduced images in the region A of the user A allocated in the HDD 304, and refers to the headers of the received reduced images to obtain the sending IDs (S505). Thereafter, the controller 302 accesses a database provided on the HDD 304. The database stores history information about sending IDs. The history information about the sending IDs includes information for managing histories of reduced images sent from the digital camera 100 (the user A) up to now, and histories of copying of images from the region of the region A to a region of another user. When the controller 302 obtains the sending IDs at step S505, it registers them in a database so as to update the history information about the sending IDs (S506). FIG. 7 illustrates one example of the history information. History information in FIG. 7 is the history information about the region A. The history information relates the sending IDs, information about a date of recording of the reduced images with the sending IDs to the region A, and information representing a region where the reduced images are copied with each other. The copying of reduced images will be described later.

When determining that the selection of images to be uploaded is completed (YES at S501), the controller 130 of the digital camera 100 may determine whether the digital camera 100 is connected to the PC 250. At this time, when the digital camera 100 is connected to the PC 250, the controller 130 may send the original-size images to the internet image sharing service 102 via the PC 250 according to a request from the PC 250. On the other hand, when the digital camera 100 is not connected to the PC 250, the controller 130 generates and sends reduced images, as describe above (S502 to S504).

The reduced images sent from the digital camera 100 to the internet image sharing service 102 are, thereafter, replaced by the original-size images in the internet image sharing service 102.

2-2. Transfer of Original-Size Images from Digital Camera to Internet Image Sharing Service via PC The transfer of original-size images from the digital camera 100 to the internet image sharing service 102 via the PC 250 will be described below. As shown in FIG. 1B, a case where the digital camera 100 is connected via the USB cable to the PC 250 is assumed. The PC 250 is connected to the internet network 104 via a wired LAN or the like.

When the digital camera 100 and the PC 250 are at home, a wireless LAN or a wired LAN is used as a means for connection to the Internet network. In general, a transfer speed of these LANs is considered to be sufficiently high for transfer of data with a data volume of original-size images. Therefore, in this case, even when a large volume of original-size images are transferred, the transfer process is completed in a short amount of time, and thus, user's usability is not deteriorated. Therefore, in the first embodiment, when the digital camera 100 is connected to the PC 250 (namely, when high-speed communication can be expected), the PC 250 obtains original-size images corresponding to the sent reduced images from the digital camera 100 and transfers them to the Internet image sharing service 102 (the external server 300).

Figure 8:
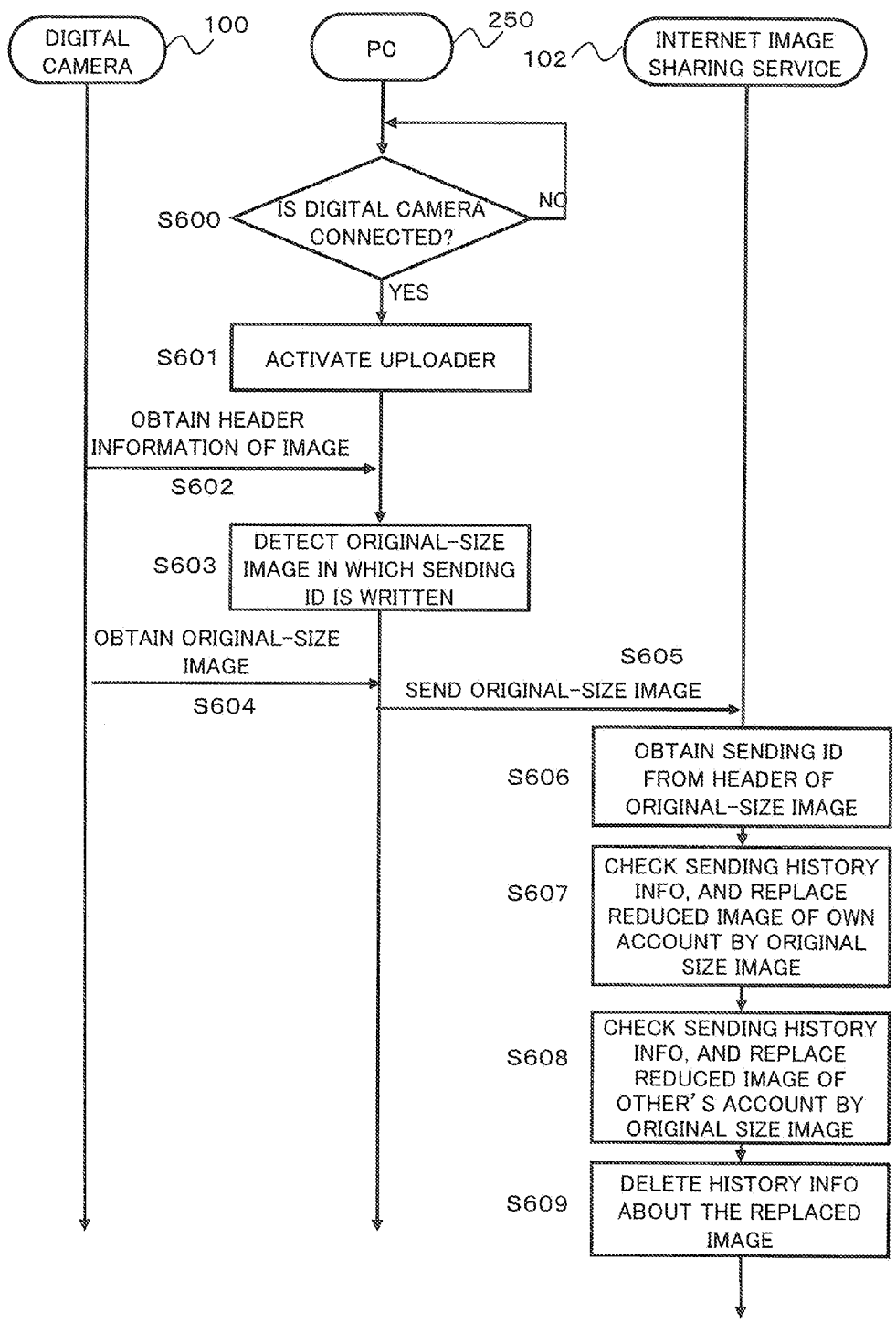
FIG. 8 is a flowchart illustrating an operation for replacing a reduced image in the image sharing service by an original-size image using the personal computer.

The transfer operation of original-size images and the operation for replacing the reduced images by the original-size images when the digital camera 100 is connected to the PC 250 will be described below. FIG. 8 is a flowchart illustrating an operation among the digital camera 100, the PC 250 and the internet image sharing service 102.

When the controller 251 of the PC 250 detects that the digital camera 100 is connected to the USB connector 260 (Yes at S600), the controller 251 activates an uploader which is pre-installed in the PC 250 (S601). The uploader refers to original-size images stored in the digital camera 100, and obtains information of the header portions of the original-size images (S602). The uploader detects original-size images which the sending IDs are written into their header portions, based on the obtained information of the header portions (S603). The controller 251 obtains original-size images of which sending IDs can be detected, from the digital camera 100 (S604). The controller 251 sends the obtained original-size images to the internet image sharing service 102, namely, the external server 300 (S605). In the internet image sharing service 102, the controller 302 of the external server 300 refers to the headers of the received original-size images, and obtains the sending IDs (S606). The controller 302 matches the obtained sending IDs with the sending IDs recorded in the history information of the sending IDs. As a result of matching, when the sending ID corresponding to the obtained sending ID is included in the history information, the controller 302 replaces the reduced image stored in the region A of the user A by the corresponding original-size image (S607). The reduced images stored in the region A are reduced images that are sent at step S504 in the flow of FIG. 5.

Further, when the images are copied in the region A, namely, the history information about the sending IDs includes a history representing the copying of the reduced images from the region A to the region B, the controller 302 replaces the reduced images in the region B by the original-size images (S608). The operation for copying the reduced image from one region to another region will be described in detail later.

When the above process is completed, the controller 302 deletes a record of the sending IDs corresponding to the processed images from the history information (S609). At this time, all the images of which sending IDs are detected at step S603 may be processed at one time, or each of the images may be sequentially processed in such a manner that while one original-size image is being transferred at step S605, a next image of which sending ID is written is detected.

2-2-1. Operation for Copying Image Data

Figure 9:
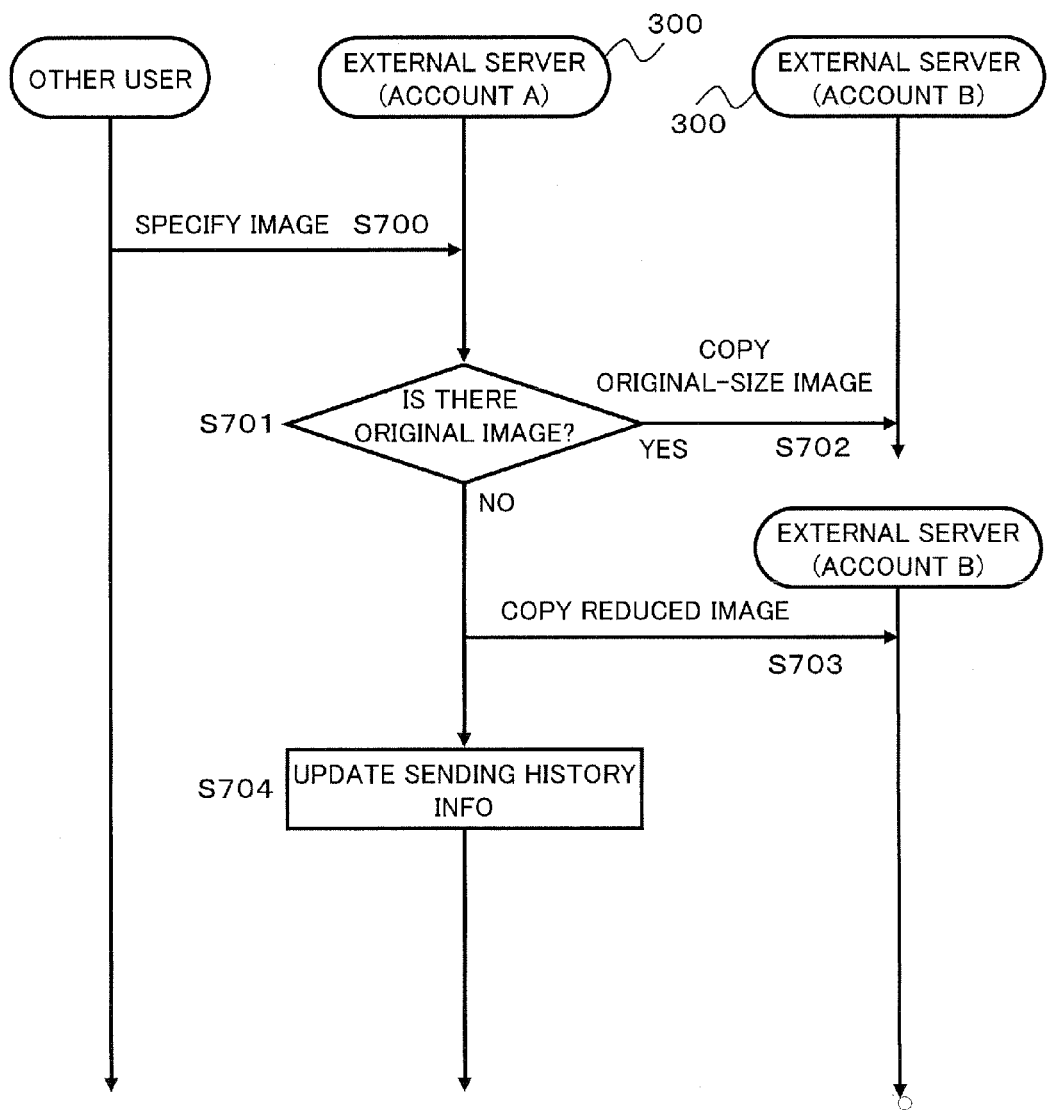
FIG. 9 is a flowchart illustrating an operation when another user specifies a request for copy of images in the image sharing service.

An operation for copying image data from a region of one user to a region of another user will be described below. FIG. 9 is a flowchart illustrating an operation when the copying of images stored in the region A of the user A is requested by the user B in the image sharing service 102.

Figure 10:
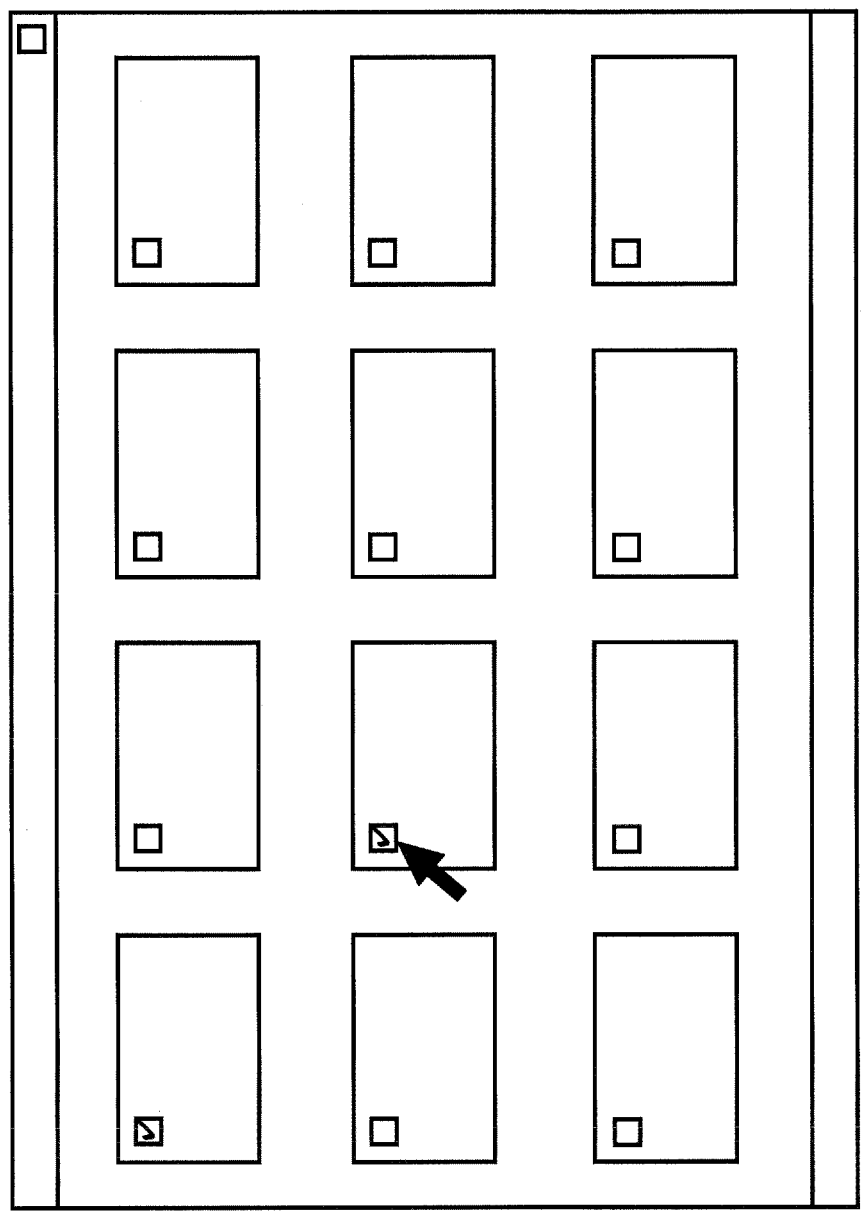
FIG. 10 is a diagram illustrating a screen for selecting images in the image sharing service by another user.

In the image sharing service 102 according to the first embodiment, the user can access the Internet image sharing service 102 from the user's PC or mobile terminal. At this time, when one user (the user A) permits the user B to access the region allocated to the user A (the region A) in the image sharing service 102, the image sharing service 102 permits the user B to access the region (the region A) of the user A. FIG. 10 is a diagram illustrating a screen which is displayed on the display of the PC or the mobile terminal of the user B when the user B accesses the region A to which the user B is permitted to access by the user A. On this screen, a list of thumbnail images of the images stored in the region A of the user A are displayed. The user B can specify (select) images desired to be copied to the region B of the user B on this screen by operating the predetermined operation section 150. Information about the images specified (selected) by the user B is notified to the external server 300 (S700 in FIG. 9).

Thereafter, the controller 302 of the external server 300 determines whether original-size images corresponding to the specified images are present in the region A (S701). When the original-size images corresponding to the specified images are present in the region A (Yes at S701), the controller 302 of the external server 300 copies the original-size images corresponding to the specified images from the region A to the region B (S702). In this case, the sending history information does not have to be updated by the controller 302.

On the other hand, when the original-size images corresponding to the specified images are not present in the region A (No at S701), namely, when only reduced images corresponding to the specified images are present in the region A, the controller 302 of the external server 300 copies the reduced images corresponding to the specified images from the region A to the region B (S703). When the copying of the reduced images is completed, the controller 302 updates the history information that manages the region A by adding a history representing that the reduced images are copied from the region A to the region B (S704).

In such a manner, images are copied from a region of a certain user to a region of another user. In this case, when reduced images are copied to another region, the information representing the copying is recorded in the history information.

3. Conclusion

The digital camera 100 according to the first embodiment is an apparatus, that can send image data to the external server 300 connected to the network, includes the communication unit 171 for sending image data, and the controller 130 for selecting images to be sent based on user's operation and controlling the communication unit 171. The controller 130 controls the communication unit 171 to send reduced image data which is created by reducing original-size image data of the selected image to the external server 300. Further, the controller 130 controls the communication unit 171 to send the original-size image data corresponding to the reduced image data already sent to the external server 300 to the external server 300. As a result, the digital camera 100 once sends the reduced images to the external server 300 in order to prioritize a sending speed, and thereafter, when the high-speed communication is assumed to be enabled, the digital camera 100 can send the original-size images to the external server 300. As a result, deterioration in user's convenience which is caused by a slow communication speed can be prevented.

Further, in the digital camera 100 according to the first embodiment, the controller 130 generates the sending ID that relates an image to be sent with a reduced image of the image to be sent. The controller 130 makes a control so as to send the sending ID to the external server 300 while relating the sending ID with the image to be sent and the reduced image of the image to be sent. With reference to the sending ID, the external server 300 can replace the reduced image by the original-size image.

Further, in the digital camera 100 according to the first embodiment, the controller 130 may detect a communication environment of the digital camera 100 (e.g., connection/non-connection to the PC, communication speed, or the like). When the detected communication environment is a first environment (e.g., the situation that the high-speed communication cannot be executed, or the situation that battery consumption becomes a problem), the controller 130 sends reduced image data to the external server. When the detected communication environment is the second environment (e.g., the situation that the high-speed communication can be executed, or the situation that battery consumption does not become a problem), the controller 130 sends the original-size image data to the external server. With this constitution, in the situation that the communication environment is bad (e.g., the situation that the high-speed communication cannot be expected, or the battery consumption becomes a problem), reduced images with smaller data size can be sent, and in the situation that the communication environment is good, original-size images with larger data size can be sent. As a result, the uploading operation in view of user's convenience can be performed.

When the detected communication environment is the first environment, the controller 251 of the PC 250 makes a control to obtain original-size images, that correspond to the reduced images already sent to the external server 300 and that are not sent to the external server 300, from the digital camera 100. As a result, the PC 250 can send only the original-size images which are not sent yet, to the external server 300, thereby preventing useless image transfer.

In the first embodiment, the external server 300 is the server that can receive image data from the digital camera 100 and can store it. The external server 300 includes the communication unit 301 for receiving image data via a network, the HDD 304 for storing the received image data therein, and the controller 302 for controlling the recording of the image data to the HDD 304. When the controller 302 receives reduced image data from the digital camera 100, it stores the received reduced image data to the HDD 304. Thereafter, when the controller 302 receives original-size image data corresponding to the reduced image data stored in the HDD 304 from the digital camera 100, it controls the HDD 304 to replace the reduced image data stored in the HDD 304 by the received original-size image data. With such an arrangement, in the external server 300, the reduced image is replaced by the original-size image.

In the external server 300, the HDD 304 includes the region A allocated to the user A and the region B allocated to the user B. The controller 302 receives an instruction for copying images from the region A to the region B via the communication unit 301. When a type of the image data instructed to be copied is an original-size image, the controller 302 controls the HDD 304 to copy the original-size image data from the region A to the region B. On the other hand, when the type of the image data instructed to be copied is a reduced image, the controller 302 controls once the HDD 304 to copy reduced image data from the region A to the region B. Thereafter, when receiving the original-size image data corresponding to the reduced image data, the controller 302 controls the HDD 304 to replace the reduced image data copied to the region B by the received original-size image data and record it therein. As a result, the user B can copy a original-size image for a desired image in the images stored in the region A to the region B.

The first embodiment has been described such that, when the digital camera 100 is not connected to the PC 250, the digital camera 100 sends the reduced image via a communication line with a lower speed. However, when the digital camera 100 is connected to the PC 250 and an image to be sent is selected first, the PC 250 may send the original-size image immediately without sending the reduced image. In this case, the history information of the sending ID is not needed in the internet image sharing service 102.

The first embodiment has been described such that the uploader is pre-installed in the PC 250, which is not essential. The uploader may be pre-installed in the digital camera 100. In this case, when the digital camera 100 is connected to the PC 250, the controller 251 of the PC 250 may automatically activate the upload application in the digital camera 100.

Second Embodiment

Another example of the operation for uploading images to the internet image sharing service 102 via the digital camera 100 will be described. In the second embodiment, the digital camera 100 has a function for enabling connection to an Internet via a 3G network or WiFi.

FIG. 11 is a flowchart describing an operation for uploading images according to the second embodiment. Since steps S800 and S801 are the same as steps S500 and S501 in FIG. 5, the description thereof is omitted.

When a determination is made that user's selection of images to be uploaded is completed (Yes at S801), the controller 130 checks a communication environment (or communication state) (S802). Concretely, the controller 130 determines whether image data can be sent from the digital camera 100 to the internet image sharing service 102 (namely, the external server 300) at a high speed. The determination whether image data can be sent at a high speed is made based on various conditions.

For example, the determination can be made based on whether a data communication speed between the digital camera 100 and the external server is a predetermined speed or more. In another manner, the determination can be made based on a determination whether the digital camera 100 is connected to the internet via a 3G network or WiFi. For example, in the case of the WiFi connection, the determination is made that it is possible to send the original-size image data, while in the case of the 3G network, the determination can be made that it is not possible to send the original-size image data. In another manner, when the digital camera 100 is connected to the internet network via tethering, the determination may be made that it is not possible to send the original-size image data. The determination may be made based on whether the digital camera 100 is connected to an external power supply. When the digital camera 100 is connected to an external power supply, the determination may be made that it is possible to send the original-size image data because it does not need to care about the remaining amount of a battery although it would take much time to send the data. Otherwise, the determination may be made that it is not possible to send the original-size image data. In another manner, when the digital camera 100 has a battery and a remaining amount of a battery is larger than a predetermined value, the determination may be made that it is possible to send the original-size image data, and otherwise, the determination may be made that it is not possible to send the original-size image data.

When it is possible to send the main image data, the controller 130 sends image data selected to be uploaded (namely, original-size images) directly to the internet image sharing service 102 (S808).

On the other hand, when it is not possible to send the main image data, the digital camera 100 generates reduced images of the selected images (S803), and writes sending IDs in header portions of the reduced images (S804). Thereafter, the controller 130 sends the reduced images which the sending IDs are written in the header portions to the Internet image sharing service 102 (S805).

The operation of the internet image sharing service 102 (S806 and S807) thereafter is the same as that at steps S506 and S507, and the sending history information is updated.

Even when images to be uploaded are switched between original-size images and reduced images based on the communication environment (a communication speed, a type of communication line or the like), the same effect as the first embodiment can be obtained.

Other Embodiments

The embodiment is not limited to the above described embodiments, and other various embodiments are considered. Hereinafter, examples of the other embodiments will be described below.

The above embodiments have been described for the case where the sending IDs are written in headers, but the embodiment is not limited to this. That is to say, the digital camera 100 may create a list of file names of reduced images to be transferred, and send this list to the internet image sharing service 102. This is because the correspondence between the reduced image and the original-size image can be checked based on the file names and recording dates.

The above embodiments have been described for the case of the connection to an internet via the PC 250, but the embodiments are not limited to this. The digital camera 100 may be connected directly to the internet image sharing service 102 via a cradle using a high-speed line. In this case, the digital camera 100 makes the control at steps S602 to S605 in a flowchart of FIG. 8 to obtain the similar effect.

Further, for example, the digital camera 100 can variably send reduced images or original-size images according to a communication system of network connection. In another manner, a user can manually select reduced images or original-size images to be sent. Also in this case, by relating the reduced image with the original-size image, the external server can replace the reduced image already received by the original-size image upon obtaining of the original-size image.

Although the above embodiments, as shown in FIG. 1B, have been described using the example that the digital camera 100 is connected to the PC 250 by the USB, the embodiment is not necessarily limited to this. In another embodiment, image data of the digital camera 100 may be sent to the PC 250 via a removable medium. At this time, the original-size image having the sending ID for relating with the reduced image already sent to the external server 300 are recorded in the removable medium. The PC 250 sends the sending IDs recorded in the removable medium to the external server 300. The external server 300 can obtain the original-size image from the removable medium via the PC 250, and replace the reduced image already received by the obtained original-size image with reference to the received sending ID. The above embodiments have been described using a memory card as an example of the removable medium, but the removable medium is not limited to this. Any other medium such as, for example, USB memory and CD-R can be used for the removable medium.

The above embodiments have been described such that that the controller 302 of the external server 300 replaces the reduced image stored in a desirable region (in the above example, region A) by the original-size image, when a sending ID corresponding to the sending ID which is obtained by analysis of the header portion is included in the history information. That is, when a sending ID corresponding to the obtained sending ID is included in the history information, the controller 302 can determine that the reduced image is stored in the specified region. On the other hand, the controller 130 of the digital camera 100 may write information representing that the image is a reduced image in the header portion of the reduced image, when sending the reduced image to the external server 300. By referring to the information, the external server 300 can discriminate the original-size image from the reduced image surely. In short, the embodiment is not limited to that described above, if the reduced image is related to the original-size image and the reduced image can be replaced by the main image when the original-size image is obtained.

The above embodiments describe an example that a still image is an image to be sent. However, the embodiment is not limited to this. For example, an image to be sent may be a moving image data. The reduced image of the moving image data may be a moving image that is processed by a compressing scheme for making a data volume smaller than that of the main body moving image, a moving image whose resolution is reduced to be lower than that of the main body moving image, or a moving image that is re-encoded by an encoding scheme where a compression ratio is higher than that of the main body moving image.

The above embodiments describe the example that reduced images are generated at a timing that image to be sent is determined (S502 in FIG. 5), but the timing of generating reduced image is not limited to this. For example, the digital camera 100 may record images with two kinds of sizes including a size for storing an image in the digital camera and a size for sending an image to the external server at a time of recording still images. Similarly, the digital camera 100 may record moving images by two compression formats including a compression format for storing an image in the digital camera and a compression format for sending an image to the external server. In this case, when sending a moving image to be sent to the external server 300, the digital camera 100 sends a moving image prepared for sending to the external server (the image with the size for sending an image to the external server/the image compressed in the compression format for sending an image to the external server). In another embodiment, when recording a still image, if the corresponding thumbnail image is also generated and recorded in Exif format or the like, the digital camera 100 may use the thumbnail image as the image to be sent to the external server. As a result, the digital camera 100 does not require the process for generating reduced images, and thus, an effect that a time for uploading to the external server becomes short can be expected.

The digital camera 100 may be a camera incorporating a lens or a lens interchangeable camera.

The above embodiments have been described using the digital camera as one example of an apparatus for sending image data, but the apparatus for sending image data is not limited to the digital camera. The above technical idea can be applied to any apparatuses that can be connected to a network and can send data to the server on the network (for example, mobile phones, smart phones and movie cameras).

INDUSTRIAL APPLICABILITY

The above embodiments can be applied widely to techniques for uploading image data from one apparatus via a network to another apparatus. That is to say, the embodiment can be applied to image sending apparatuses for sending image data to be uploaded (for example, digital cameras, mobile phones, smart phones and movie camera) and image recording apparatuses (servers) for recording the image data sent from the image sending apparatus into recording media.

What is claimed is:

1. An image sending apparatus capable of sending image data to an image recording apparatus connected to a network, comprising;
   a sending unit configured to send image data;
   a selecting unit configured to select an image to be sent based on a user's operation; and
   a controller configured to control the sending unit,
   wherein the controller controls the sending unit to send, to the image recording apparatus, reduced image data generated by reducing original image data of the image selected by the selecting unit, and thereafter to send, to the image recording apparatus, the original image data corresponding to the reduced image data sent to the image recording apparatus,
   the controller generates identification information that relates the original image data to be sent with the reduced image data corresponding to the original image, the identification information being unique to each of plural pieces of the original image data, and
   the controller controls the sending unit to send the identification information to the image recording apparatus, with the identification information related with the original image data to be sent and/or with the reduced image data corresponding to the original image data to be sent.

2. The image sending apparatus according to claim 1, further comprising a detector configured to detect a communication environment of the image sending apparatus,
   wherein the controller controls the sending unit to send the reduced image data to the image recording apparatus when the detector detects that the communication environment is a first communication environment, and to send the original image data to be selected to the image recording apparatus when the detector detects that the communication environment is a second communication environment.

3. The image sending apparatus according to claim 2, wherein the controller controls the sending unit to send, to the image recording apparatus, the original image data that corresponds to the reduced image data already sent to the image recording apparatus and that is not sent to the image recording apparatus yet, when the detector detects that the first communication environment is changed to the second communication environment.

4. The image sending apparatus according to claim 2, wherein
   the first communication environment is a situation that a communication speed for sending data to the image recording apparatus is lower than a predetermined speed, and
   the second communication environment is a situation that the communication speed for sending data to the image recording apparatus is higher than the predetermined speed.

5. The image sending apparatus according to claim 2, wherein
   the first communication environment is a situation that a remaining amount of a battery for supplying a power to the image recording apparatus is smaller than a predetermined value,
   the second communication environment is a situation that the remaining amount of the battery is larger than the predetermined value.

6. An image recording apparatus capable of receiving the image data from the image sending apparatus according to claim 1 and storing the received image data therein, the image recording apparatus comprising:
   a communication unit configured to receive the reduced image data, the original image data, and the identification information via the network;
   a data storage unit configured to store the received image data; and
   a controller configured to control recording of the image data to the data storage unit,
   wherein
   when the reduced image data is received from the image sending apparatus, the controller controls the data storage unit to store the received reduced image data therein, and
   thereafter when original image data corresponding to the reduced image data stored in the data storage unit is received from the image sending apparatus, the controller controls the data storage unit to replace the reduced image data stored in the data storage unit with the received original image data by referring to the identification information.

7. The image recording apparatus according to claim 6, wherein
   the data storage unit includes a first storage region allocated to a first user and a second storage region allocated to a second user,
   when the controller receives an instruction for copying an image from the first storage region to the second storage region via the communication unit,
      if a type of image data instructed to be copied is an original image, the controller controls the data storage unit to copy the original image data from the first storage region to the second storage region, and
      if a type of the image data instructed to be copied is a reduced image, the controller controls the data storage unit to copy the reduced image from the first storage region to the second storage region, and after obtaining the original image data corresponding to the reduced image, the controller controls the data storage unit to replace the reduced image data copied to the second storage region by the obtained original image data, and record the replaced image data in the second storage region.

8. An image recording method for recording image data received via a network, comprising:
   receiving reduced image data that is generated by reducing original image data, from an image sending apparatus via the network, the reduced image data and the original image data being related to each other by identification information which is sent from the image sending apparatus, the identification information relating the original image data to be sent with the reduced image data corresponding to the original image, the identification information being unique to each of plural pieces of the original image data;
   storing the received reduced image data in a data storage unit;
   thereafter, when receiving the original image data corresponding to the reduced image data stored in the data storage unit from the image sending apparatus, replacing the reduced image data stored in the data storage unit with the received original image data by referring to the identification information which is received from the image sending apparatus.

9. The image recording method according to claim 8, wherein
   the data storage unit includes a first storage region allocated to a first user and a second storage region allocated to a second user, the recording method further comprising:
   receiving an instruction for copying an image from the first storage region to the second storage region;
   when a type of the image instructed to be copied is an original image, copying the original image data from the first storage region to the second storage region; and when the type of the image instructed to be copied is a reduced image, copying the reduced image data from the first storage region to the second storage region, after the original image data corresponding to the reduced image is obtained, replacing the reduced image data copied to the second storage region by the obtained original image data, and recording the replaced image data in the second storage region.

* * * * *